(12) United States Patent
Chen et al.

(10) Patent No.: US 10,129,374 B2
(45) Date of Patent: *Nov. 13, 2018

(54) MOBILE COMMUNICATIONS DEVICE

(71) Applicant: Huawei Technologies Co., Ltd., Shenzhen (CN)

(72) Inventors: Xiaoning Chen, Shenzhen (CN); Tingting Ge, Shenzhen (CN); Guiyun Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,355

(22) Filed: Feb. 5, 2018

(65) Prior Publication Data

US 2018/0159966 A1    Jun. 7, 2018

Related U.S. Application Data

(63) Continuation of application No. 15/539,420, filed as application No. PCT/CN2014/094658 on Dec. 23, 2014, now Pat. No. 9,888,099.

(51) Int. Cl.
  *H04M 1/02* (2006.01)
  *G02F 1/13* (2006.01)
  *G06F 3/041* (2006.01)
(52) U.S. Cl.
  CPC ............ *H04M 1/0202* (2013.01); *G02F 1/13* (2013.01); *G06F 3/0412* (2013.01); *H04M 1/02* (2013.01); *H04M 1/0266* (2013.01)

(58) Field of Classification Search
  None
  See application file for complete search history.

(56) References Cited

U.S. PATENT DOCUMENTS 7,876,288 B1    1/2011   Huang
2007/0085838 A1  4/2007   Ricks et al.
(Continued)

FOREIGN PATENT DOCUMENTS

CN    203181024 U    9/2013
CN    203217204 U    9/2013
(Continued)

OTHER PUBLICATIONS

Machine Translation and Abstract of Chinese Publication No. CN103995795, Aug. 20, 2014, 5 pages.
(Continued)

*Primary Examiner* — David Bilodeau
(74) *Attorney, Agent, or Firm* — Conley Rose, P.C.

(57) ABSTRACT

A mobile communications device. The mobile communications device has a rectangular housing and a touchscreen. The housing has a bonding surface configured to bond with the touchscreen, one end of the bonding surface that is provided with a control button and the other end opposite to the end that is provided with a control button are each provided with a supporting surface, the touchscreen is adhered to the supporting surfaces, and two opposite side surfaces of the housing are each connected to the touchscreen in a sealed manner using a sealing piece. The two opposite side surfaces are side surfaces that are perpendicular to a frame line of the end of the bonding surface that is provided with a control button.

8 Claims, 3 Drawing Sheets

(56) References Cited

U.S. PATENT DOCUMENTS

| | | | |
|---|---|---|---|
| 2012/0256867 A1* | 10/2012 | Annacone | G06F 3/044 |
| | | | 345/174 |
| 2015/0220218 A1 | 8/2015 | Jeon et al. | |
| 2015/0260907 A1 | 9/2015 | Yang et al. | |
| 2017/0146851 A1* | 5/2017 | Shi | G02F 1/133308 |
| 2017/0192291 A1* | 7/2017 | Shi | G02F 1/133308 |

FOREIGN PATENT DOCUMENTS

| | | |
|---|---|---|
| CN | 103995795 A | 8/2014 |
| CN | 104133310 A | 11/2014 |
| CN | 104181716 A | 12/2014 |
| CN | 105283002 A | 1/2016 |
| JP | 2012216206 A | 11/2012 |
| TW | 201446843 A | 12/2014 |

OTHER PUBLICATIONS

Machine Translation and Abstract of Chinese Publication No. CN104133310, Nov. 5, 2014, 8 pages.

Machine Translation and Abstract of Chinese Publication No. CN104181716, Dec. 3, 2014, 7 pages.

Machine Translation and Abstract of Chinese Publication No. CN105283002, Jan. 27, 2016, 8 pages.

Machine Translation and Abstract of Chinese Publication No. CN203181024, Sep. 4, 2013, 4 pages.

Machine Translation and Abstract of Chinese Publication No. CN203217204, Sep. 25, 2013, 6 pages.

Machine Translation and Abstract of Japanese Publication No. JP2012216206, Nov. 8, 2012, 20 pages.

Foreign Communication From A Counterpart Application, Chinese Application No. 201480060088.4, Chinese Office Action dated Apr. 20, 2018, 5 pages.

Foreign Communication From A Counterpart Application, European Application No. 14908718.1, Extended European Search Report dated Oct. 30, 2017, 8 pages.

Foreign Communication From A Counterpart Application, PCT Application No. PCT/CN2014/094658, English Translation of International Search Report dated Sep. 21, 2015, 2 pages.

Foreign Communication From A Counterpart Application, PCT Application No. PCT/CN2014/094658, English Translation of Written Opinion dated Sep. 21, 2015, 6 pages.

* cited by examiner

MOBILE COMMUNICATIONS DEVICE

CROSS-REFERENCE TO RELATED APPLICATIONS

This application is a continuation of U.S. patent application Ser. No. 15/539,420, filed on Jun. 23, 2017, now U.S. Pat. No. 9,888,099, which is a national stage of International Application No. PCT/CN2014/094658, filed on Dec. 23, 2014. All of the aforementioned patent applications are hereby incorporated by reference in their entireties.

TECHNICAL FIELD

The present disclosure relates to the technical field of communications devices, and in particular, to a mobile communications device.

BACKGROUND

Most communications devices have touchscreens. The communications devices generally use a narrow-frame design to improve display effects of the communications devices. As shown in FIG. 1 and FIG. 2, FIG. 1 shows a structure of a mobile phone in the prior art, and FIG. 2 is a sectional view at A-A in FIG. 1. It can be seen from FIG. 1 and FIG. 2 that a housing 1 of a traditional mobile phone needs to be provided with a step structure configured to be adhered to a touchscreen 2. A width of the step structure generally needs to ensure a width of above 0.8 millimeters (mm) for adhesion by a double-sided tape or a width of above 0.3 mm for adhesion by dispensing glue. Requirements for characteristics of the double-sided tape and the glue are very high to ensure product quality, and when the structure is used, a frame still needs to have a given width to ensure adhesion firmness of the touchscreen. As a result, a frame width cannot be reduced, and narrow-frame development of mobile phones is affected.

SUMMARY

The present disclosure provides a mobile communications device, so as to reduce a width of a frame of the mobile communications device and further improve a narrow-frame design effect.

According to a first aspect, a mobile communications device is provided. The mobile communications device has a rectangular housing and a touchscreen. The housing has a bonding surface configured to bond with the touchscreen, one end of the bonding surface that is provided with a control button and the other end opposite to the end that is provided with a control button are each provided with a supporting surface, the touchscreen is adhered to the supporting surfaces, and two opposite side surfaces of the housing are each connected to the touchscreen in a sealed manner using a sealing piece. The two opposite side surfaces are side surfaces that are perpendicular to a frame line of the end of the bonding surface that is provided with a control button.

With reference to the first aspect, in a first possible implementation manner, one side surface of the sealing piece is flush with a surface of the touchscreen that is away from the housing, and another side surface of the sealing piece is flush with a surface of the housing that is away from the touchscreen.

With reference to the first aspect, in a second possible implementation manner, a surface of the sealing piece that is towards the housing is attached with a double-sided tape or dispensing glue, and the sealing piece is separately connected to the housing and the touchscreen in a sealed manner using the double-sided tape or the dispensing glue.

With reference to the first aspect, the first possible implementation manner of the first aspect, or the second possible implementation manner of the first aspect, in a third possible implementation manner, the sealing piece is a metal sealing piece.

With reference to the third possible implementation manner of the first aspect, in a fourth possible implementation manner, a length of the sealing piece is the same as a length of the housing, and two end surfaces of the sealing piece are respectively flush with two end surfaces of the housing With reference to the third possible implementation manner of the first aspect, in a fifth possible implementation manner, each end of the housing extends towards two sides of the housing to form protruding structures configured to cover the sealing piece, and a length by which each protruding structure extends is the same as a thickness of the sealing piece.

With reference to the fifth possible implementation manner of the first aspect, in a sixth possible implementation manner, the sealing piece is separately adhesively connected to the protruding structures that are located at two ends of the sealing piece.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner, the two ends of the housing are provided with step structures that are opposite to each other, and a step surface of the step structure is the supporting surface.

With reference to the seventh possible implementation manner of the first aspect, in an eighth possible implementation manner, two ends of the touchscreen are each provided with a recessed structure that matches the step structure.

With reference to the first aspect, in a ninth possible implementation manner, the mobile communications device is a mobile phone or a tablet computer.

The mobile communications device provided according to the first aspect improves an adhesion location of a frame and a touchscreen and effectively reduces a width of the frame using a sealing piece to connect a housing and two sides of a touchscreen, thereby further achieving a narrow-frame effect of the mobile communications device, which is beneficial to a display effect of the mobile communications device. In addition, the housing and the two sides of the touchscreen are sealed using the sealing piece such that an ultra-thin sealed mechanical part at a side implements waterproof, dust-proof, and antistatic functions and the like.

Figure 1:
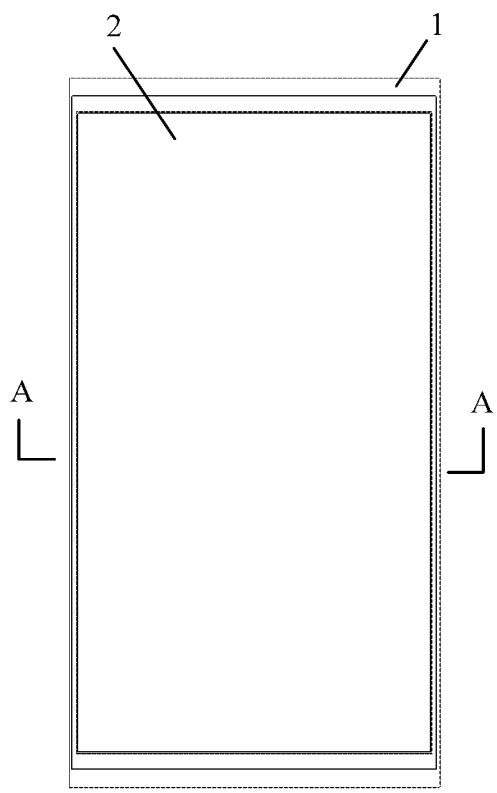
FIG. 1 is a schematic structural diagram of a mobile phone.
Figure 2:
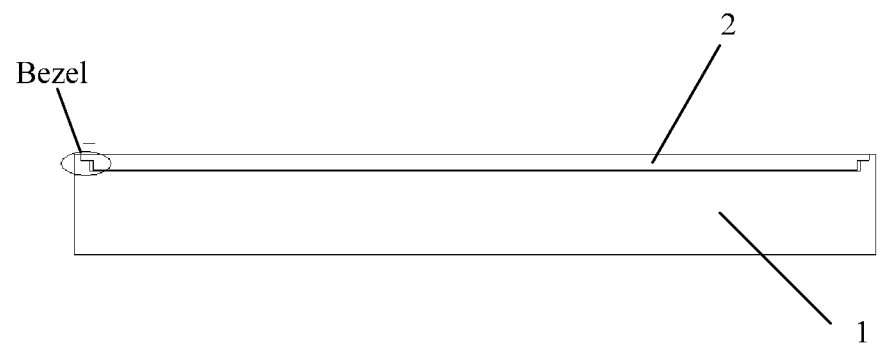
FIG. 2 is a sectional view at A-A in FIG. 1.

| Reference numerals: | | |
|---|---|---|
| 1: housing | 2: touchscreen | 10: housing |
| 11: step structure | 12: protruding structure | 20: touchscreen |
| 21: recessed structure | 30: sealing piece | 40: double-sided tape |

DESCRIPTION OF EMBODIMENTS

The following describes various embodiments of the present disclosure in detail with reference to accompanying drawings. It should be understood that the various implementation manners described herein are merely used to describe and explain the present disclosure but are not intended to limit the present disclosure.

Figure 3:
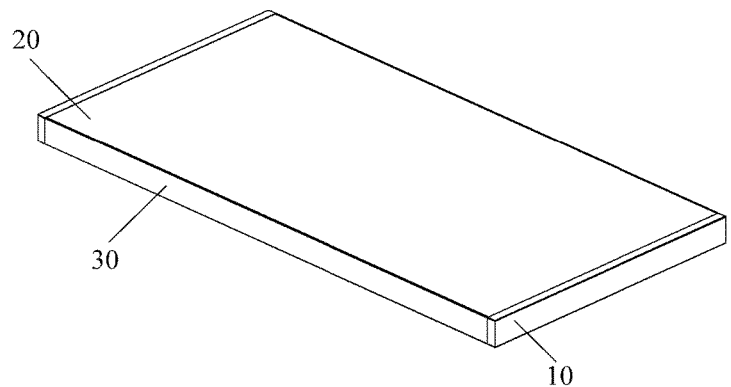
FIG. 3 is a schematic diagram of an overall structure of a mobile communications device according to an embodiment of the present disclosure.
Figure 4:
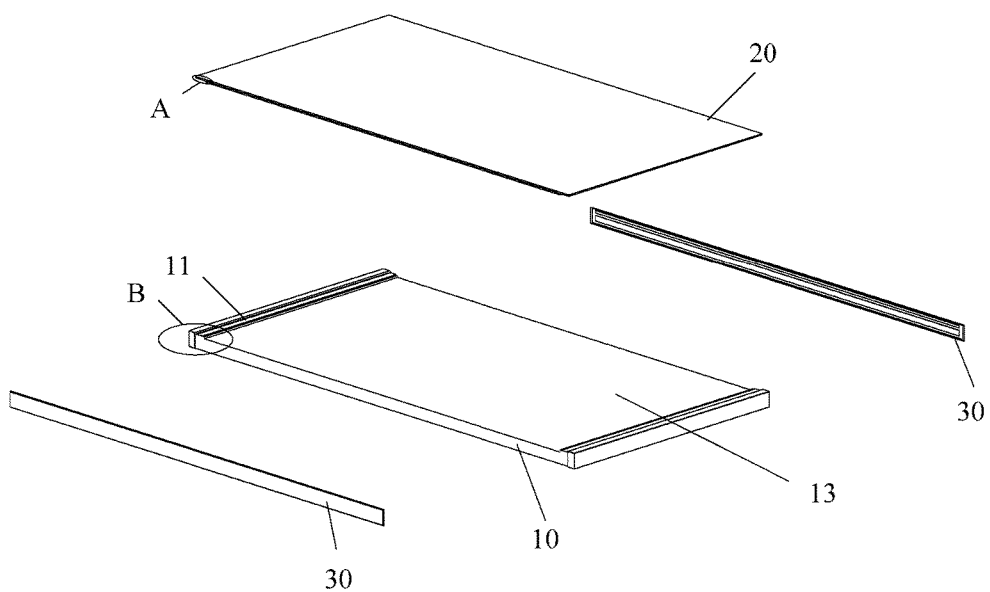
FIG. 4 is a schematic exploded view of a communications device according to an embodiment of the present disclosure.

FIG. 3 shows a schematic diagram of an overall structure of a mobile communications device according to the embodiments of the present disclosure, and FIG. 4 shows a schematic exploded view of the communications device.

For ease of understanding of the embodiments of the present disclosure, the following describes "end" and "side" mentioned in the embodiments of the present disclosure. Two ends of a housing 10 refer to end portions of the housing 10 in a length direction, and two sides of the housing 10 refer to two relatively narrow surfaces of the housing 10 that are connected to two end surfaces of the housing 10. Two ends of a sealing piece 30 refer to end portions of the sealing piece 30 in a length direction, and two sides of the sealing piece 30 refer to two relatively narrow surfaces that are connected to the two ends of the sealing piece 30. Similarly, two ends of a touchscreen 20 refer to end portions of the touchscreen 20 in a length direction, and two sides of the touchscreen 20 refer to two relatively narrow surfaces that are connected to the two ends of the touchscreen 20.

The embodiments of the present disclosure provide a mobile communications device. The mobile communications device has a rectangular housing 10 and a touchscreen 20. The housing 10 has a bonding surface 13 configured to bond with the touchscreen 20, one end of the bonding surface 13 that is provided with a control button and the other end opposite to the end that is provided with a control button are each provided with a supporting surface, the touchscreen 20 is adhered to the supporting surfaces, and two opposite side surfaces of the housing 10 are each connected to the touchscreen 20 in a sealed manner using a sealing piece 30. The two opposite side surfaces are side surfaces that are perpendicular to a frame line of the end of the bonding surface 13 that is provided with a control button.

In the forgoing embodiments, a structure in which a width of the touchscreen 20 and a width of the housing 10 are the same is used, the sealing piece 30 is used at a side surface to connect the housing 10 and two sides of the touchscreen 20, and an adhesion manner of the two sides of the touchscreen 20 and the housing 10 is changed from adhesion in an up-down direction to a connection manner using a sealing piece 30 at a side surface such that a thickness of the sealing piece 30 can be effectively lower than a width of a frame in the prior art, thereby further achieving a narrow-frame effect of the mobile communications device, which is beneficial to a display effect of the mobile communications device. In addition, the housing 10 and the two sides of the touchscreen 20 are sealed using the sealing piece 30 such that a ultra-thin sealed mechanical part at a side implements waterproof, dust-proof, and antistatic functions and the like.

For convenience of understanding of the embodiments of the present disclosure, the following provides detailed descriptions using various embodiments.

As shown in FIG. 3, the mobile communications device may be a common mobile communications device such as a mobile phone or a tablet computer.

Figure 5:
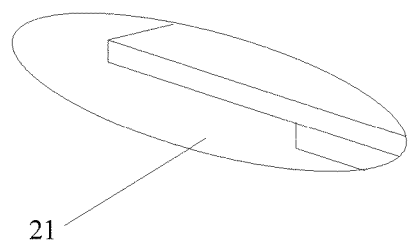
FIG. 5 is a partially enlarged view at B in FIG. 4.
Figure 6:
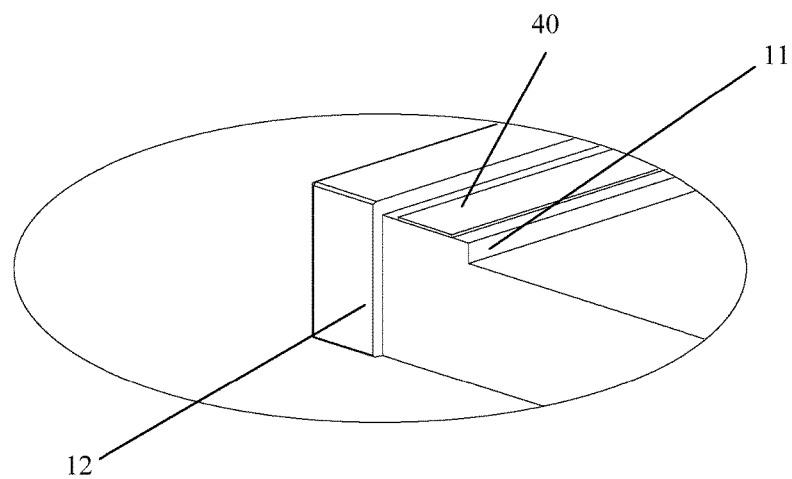
FIG. 6 is a partially enlarged view at C in FIG. 4.

FIG. 5 shows a recessed structure 21 of the touchscreen 20, and FIG. 6 shows a step structure 11 of the housing 10. The touchscreen 20 in the forgoing embodiments is adhered to the supporting surface of the housing 10. In an embodiment, two ends of the housing 10 are provided with step structures 11 that are opposite to each other, a step surface of the step structure 11 is the supporting surface, and the touchscreen 20 is adhered to the step surface. The touchscreen 20 is provided with the recessed structure 21 that matches the step structure 11 such that the touchscreen 20 can be flush with an upper surface of the housing 10. The upper surface is a plane at a highest location of the two ends of the housing 10 in FIG. 3. When the structure is used, the step surface is provided with a double-sided tape 40 or dispensing glue, and the housing 10 is adhesively connected to the touchscreen 20 using the dispensing glue or the double-sided tape 40.

Figure 7:
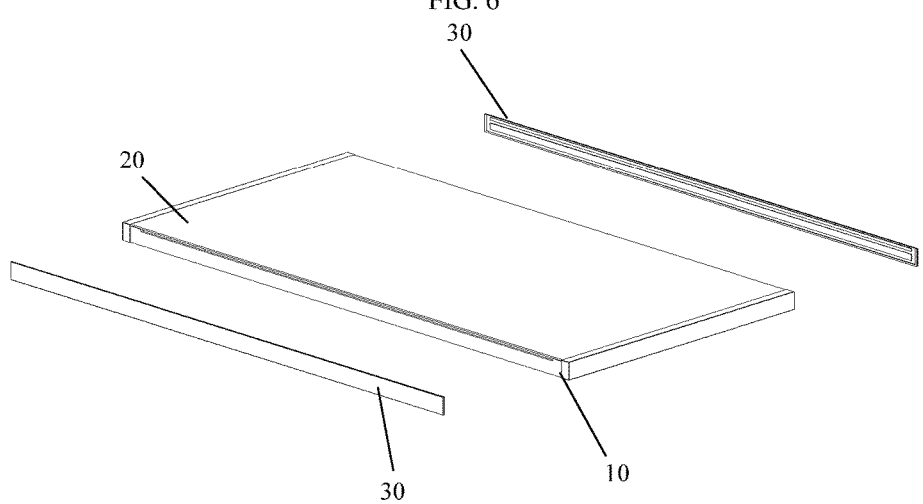
FIG. 7 is a schematic diagram after a display screen and a housing are assembled according to an embodiment of the present disclosure.

Referring to FIG. 4 and FIG. 7 together, the sealing piece 30 is a long-strip-shaped sheet-like object, a width of the sheet-like object corresponds to a thickness of the housing, and a thickness of the sheet-like object is a width of a frame of the entire device. In an embodiment, a width of a side surface of the sealing piece 30 is the width of the frame of the entire device. Besides, after assembly, one side surface of the sealing piece 30 is flush with a surface of the touchscreen 20 that is away from the housing 10, and another side surface of the sealing piece 30 is flush with a surface of the housing 10 that is away from the touchscreen 20. In an embodiment, one side surface of the sealing piece 30 is flush with an outer surface of the touchscreen 20, and another side surface is flush with an outer surface of the housing 10. In an embodiment, an exterior of the entire mobile communications device is integrally flush, and a case in which appearance is affected because connection locations among components are not flush is prevented. In addition, when the mobile communications device is in use, by means of the foregoing structure, the sealing piece 30 is not easy to separate from the housing 10 and the touchscreen 20 under an external force such that adhesion stability of the sealing piece 30 is improved.

When a connection is performed, a surface of the sealing piece 30 that is towards the housing 10 is adhered with the double-sided tape 40 or the dispensing glue, and the sealing piece 30 is separately connected to the housing 10 and the touchscreen 20 in a sealed manner using the double-sided tape 40 or the dispensing glue.

To improve connection strength of the sealing piece 30, preferably, the sealing piece 30 is a metal sealing piece 30 which has relatively good strength, and connection strength between the housing 10 and the touchscreen 20 is improved. In addition, when the metal sealing piece 30 is used, the metal sealing piece 30 can well protect the touchscreen 20 and the housing 10, and when the mobile communications device falls by accidence or touches other objects, a metal connection piece at a side surface can provide good protection and prevents the touchscreen 20 from being damaged.

In an embodiment, when the sealing piece 30 is connected to the housing 10 and the touchscreen 20, different connection structures can be used, and the following provides descriptions using various embodiments.

Embodiment 1

A length of the sealing piece 30 is the same as a length of the housing 10, and two end surfaces of the sealing piece 30 are respectively flush with two end surfaces of the housing 10.

When the forgoing structure is used, two ends of the sealing piece 30 are separately exposed, and the two exposed end surfaces are respectively flush with the two end surfaces of the housing 10, thereby ensuring regularity of appearance of the mobile communications device. In addition, by means of the forgoing structure, a structure of a connection location among the sealing piece 30, the touchscreen 20, and the housing 10 is relatively simple, which facilitates adhesion.

Embodiment 2

As shown in FIG. 6 and FIG. 7, each end of the housing 10 extends towards two sides of the housing 10 to form protruding structures 12 configured to cover the sealing piece 30, and a length by which each protruding structure 12 extends is the same as the thickness of the sealing piece 30.

In the forgoing structure, the two ends of the housing 10 extends to form the protruding structures 12 configured to cover the sealing piece 30. In an embodiment, protruding structures 12 formed at two ends of each side of the housing 10 form a clamped structure, and the sealing piece 30 is exactly clamped between the two protruding structures 12. Two ends of the sealing piece 30 are wrapped using the forgoing protruding structures 12. In addition, the protruding structures 12 form a locating structure such that the sealing piece 30 is easy to be installed. In addition, when the mobile communications device is subject to an external force, the forgoing protruding structures 12 can prevent the sealing piece 30 from being subject to a force that causes the sealing piece 30 to be misplaced such that connection strength between the sealing piece 30 and the housing 10 and connection strength between the sealing piece 30 and the touchscreen 20 are improved.

In addition, the protruding structure 12 further provides a contact surface between the sealing piece 30 and the housing 10, and, the sealing piece 30 is separately adhesively connected to the protruding structures 12 that are located at two ends of the sealing piece 30. Therefore, the connection strength between the sealing piece 30 and the housing 10 is further improved.

It can be seen from the forgoing descriptions that when the sealing piece 30 is connected to the housing 10 and the touchscreen 20, different connection structures may be used. However, it should be understood that the forgoing Embodiment 1 and Embodiment 2 merely list two structures, and a connection structure among the sealing piece 30, the housing 10, and the touchscreen 20 provided in this embodiment may use other connection structures. Principles thereof are similar to the forgoing principles, and details are not described herein again.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A mobile communications device, comprising:
   a rectangular housing; and
   a touchscreen,
   wherein the rectangular housing comprises a supporting surface configured to support the touchscreen,
   wherein the touchscreen is adhered to the supporting surface, and
   wherein two opposite side surfaces of the housing are each connected to the touchscreen in a sealed manner using a sealing piece.

2. The mobile communications device according to claim 1, wherein one side of the sealing piece is flush with a surface of the touchscreen that is away from the housing, and wherein another side of the sealing piece is flush with a surface of the housing that is away from the touchscreen.

3. The mobile communications device according to claim 1, wherein the sealing piece is a metal sealing piece.

4. The mobile communications device according to claim 1, wherein a length of the sealing piece is the same as a length of the housing, and wherein two end surfaces of the sealing piece are respectively flush with two end surfaces of the housing.

5. The mobile communications device according to claim 1, wherein two ends of the housing are provided with step structures that are opposite to each other, and wherein a step surface of the step structure is the supporting surface.

6. The mobile communications device according to claim 5, wherein two ends of the touchscreen are each provided with a recessed structure that matches the step structures.

7. The mobile communications device according to claim 1, wherein the mobile communications device is a mobile phone or a tablet computer.

8. The mobile communications device according to claim 1, wherein the sealing piece is a long-strip-shaped sheet-like object, a thickness of the sheet-like object is a width of a frame of entire the mobile communications device.

* * * * *